(12) United States Patent
Ashiba

(10) Patent No.: US 10,253,840 B2
(45) Date of Patent: Apr. 9, 2019

(54) CYLINDER APPARATUS

(71) Applicant: HITACHI AUTOMOTIVE SYSTEMS, LTD., Ibaraki (JP)

(72) Inventor: Masahiro Ashiba, Kanagawa (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/539,264

(22) PCT Filed: Dec. 24, 2015

(86) PCT No.: PCT/JP2015/085908
§ 371 (c)(1),
(2) Date: Jun. 23, 2017

(87) PCT Pub. No.: WO2016/104548
PCT Pub. Date: Jun. 30, 2016

(65) Prior Publication Data
US 2018/0017129 A1    Jan. 18, 2018

(30) Foreign Application Priority Data
Dec. 25, 2014 (JP) .................... 2014-262421

(51) Int. Cl.
*F16F 9/36* (2006.01)
*F16F 9/32* (2006.01)
(Continued)

(52) U.S. Cl.
CPC .............. *F16F 9/36* (2013.01); *F16F 9/3242* (2013.01); *F16J 15/18* (2013.01);
(Continued)

(58) Field of Classification Search
CPC .................................. F16F 9/36; F16F 9/362
(Continued)

(56) References Cited

U.S. PATENT DOCUMENTS
2006/0157940 A1    7/2006   Barbera et al.

FOREIGN PATENT DOCUMENTS
DE   1178256 B  *  9/1964  .............. F16F 9/362
EP   0687832 A1 * 12/1995  ............... A47B 9/10
(Continued)

OTHER PUBLICATIONS
EPO translation EP-0687832 A1. (Year: 1995).*
International Search Report dated Feb. 2, 2016 in International Application No. PCT/JP2015/085908.

*Primary Examiner* — Thomas J Williams
(74) *Attorney, Agent, or Firm* — Wenderoth, Lind & Ponack, L.L.P.

(57) ABSTRACT

A cylinder apparatus is configured to compatibly achieve an increase in mechanical strength and a reduction in weight of a metal ring of an oil seal member used in the cylinder apparatus. A hydraulic shock absorber (1) as a cylinder apparatus has a rod guide (9) provided at one end (2A) thereof. An annular oil seal member (10) is provided closer to the one end (2A) than the rod guide (9) so as to face the rod guide (9). The oil seal member (10) is secured by staked portions (2C) of the outer tube (2) between the staked portions (2C) and the rod guide (9). The oil seal member (10) includes a metal ring (11) and a seal member (13). The metal ring (11) is provided with a plurality of radially extending ribs (12) by locally deforming the metal ring (11).

5 Claims, 8 Drawing Sheets

(51) Int. Cl.
  *F16J 15/18* (2006.01)
  *F16J 15/3232* (2016.01)
  *F16J 15/50* (2006.01)

(52) U.S. Cl.
  CPC ... *F16F 2224/0208* (2013.01); *F16F 2230/30* (2013.01); *F16J 15/3232* (2013.01); *F16J 15/50* (2013.01)

(58) Field of Classification Search
  USPC .................................................. 188/322.17
  See application file for complete search history.

(56) References Cited

FOREIGN PATENT DOCUMENTS

| | | |
|---|---|---|
| EP | 2 647 890 | 10/2013 |
| JP | 4-105648 | 9/1992 |
| JP | 11-218178 | 8/1999 |
| JP | 2006-177556 | 7/2006 |
| JP | 2009-222128 | 10/2009 |
| JP | 2013-217392 | 10/2013 |

\* cited by examiner

CYLINDER APPARATUS

TECHNICAL FIELD

The present invention relates to a cylinder apparatus installed in a vehicle, for example, a four-wheeled automobile, and suitably used to damp vibration of the vehicle.

BACKGROUND ART

Vehicles such as automobiles are equipped with a cylinder apparatus as a shock absorber between a vehicle body and a wheel to reduce vibration generated during running. The cylinder apparatus has an outer tube and an inner tube, and a rod connected to a piston in the inner tube projects to the outside from an opening end of the outer tube. The inner tube has a rod guide provided at an opening end thereof, and the opening end of the outer tube is provided with an oil seal member sealing between the outer tube and the rod. The oil seal member is formed from a metal ring and a lip seal provided at at least the inner peripheral side of the metal ring (for example, see Patent Literature 1).

CITATION LIST PATENT LITERATURE

Patent Literature 1: Japanese Utility Model Registration Application Publication No. Hei 4-105648

SUMMARY OF INVENTION

Technical Problem

Incidentally, when the oil seal member is assembled into the outer tube, the oil seal member is pushed into the outer tube, and while doing so, the opening (distal) end of the outer tube is staked. However, during the staking process, the oil seal member is strongly pressed in the axial direction of the outer tube, which may cause elastic deformation of the metal ring of the oil seal member. Under these circumstances, studies have been conducted to increase the resistance to deformation (mechanical strength) of the metal ring, and a conventional approach to this problem is to increase the plate thickness of the metal ring or to stack a plurality of metal rings. However, this approach causes an increase in weight of the oil seal member, resulting in an increase in weight of the cylinder apparatus unfavorably.

The present invention has been made in view of the above-described problems of the conventional techniques, and an object of the present invention is to provide a cylinder apparatus configured to compatibly achieve an increase in mechanical strength and a reduction in weight of a metal ring of an oil seal member.

Solution to Problem

To solve the above-described problems, the present invention provides a cylinder apparatus including a cylinder open at one end thereof and having a hydraulic fluid sealed therein, a rod projecting from at least the one end of the cylinder, an annular member provided at the one end of the cylinder, an annular oil seal member provided at a position closer to the one end of the cylinder than the annular member so as to face the annular member, and a staked (or crimped) portion provided at the one end of the cylinder to secure the oil seal member between itself and the annular member. The oil seal member has a metal ring and a seal member. The metal ring has a plurality of radially extending ribs provided by locally deforming the metal ring.

Advantages of Invention

According to the present invention, it is possible to compatibly achieve an increase in mechanical strength and a reduction in weight of the metal ring of the oil seal member.

DESCRIPTION OF EMBODIMENTS

A cylinder apparatus according to embodiments of the present invention will be explained below in detail with reference to the accompanying drawings.

Figure 1:
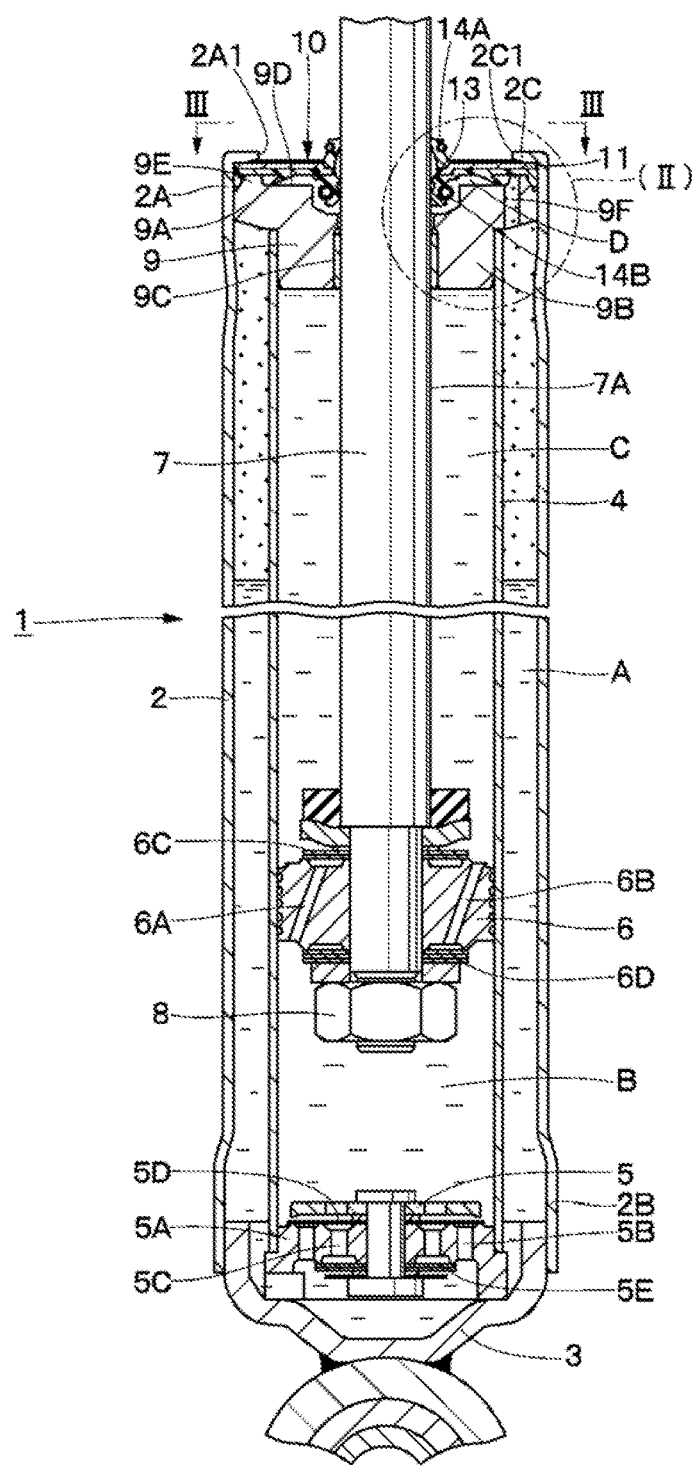
FIG. 1 is a vertical sectional view of a hydraulic shock absorber according to a first embodiment of the present invention.

First, FIGS. 1 to 4 show a first embodiment of the present invention. A cylinder apparatus shown in FIG. 1 is a hydraulic shock absorber 1 as a typical example of cylinder apparatus. The hydraulic shock absorber 1 is constructed by including an outer tube 2, an inner tube 4, a piston 6, a piston rod 7, a rod guide 9, an oil seal member 10, and so forth. The outer tube 2 and the inner tube 4 constitute a cylinder. It should be noted that in the following explanation the term "one end side" means the upper end side (upper side in FIG. 1) of the hydraulic shock absorber 1, and the term "the other end side" means the lower end side (lower side in FIG. 1) of the hydraulic shock absorber 1.

The outer tube 2 as a cylinder constitutes an outer shell of the hydraulic shock absorber 1. The outer tube 2 has an opening 2A1 at one end 2A (upper end) thereof, and the other end 2B (lower end) of the outer tube 2 is a closed end closed with a bottom cap 3. The outer tube 2 has hydraulic oil sealed therein as a hydraulic fluid. The hydraulic fluid is not limited to hydraulic oil (oil) but may be water mixed with an additive, for example.

Figure 2:
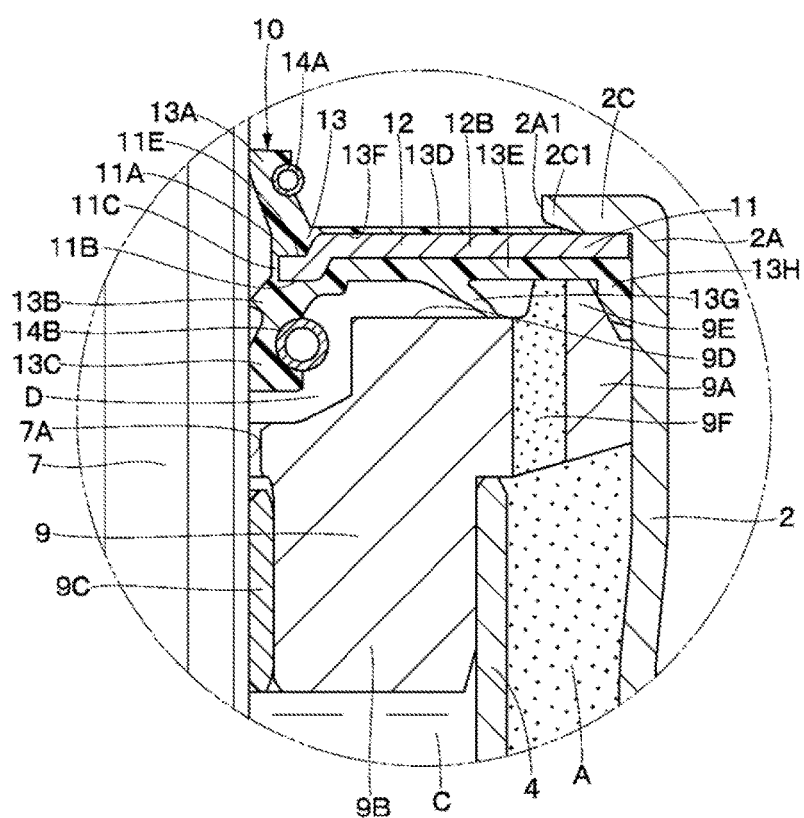
FIG. 2 is a fragmentary enlarged vertical sectional view of a part (II) of the hydraulic shook absorber in FIG. 1.
Figure 3:
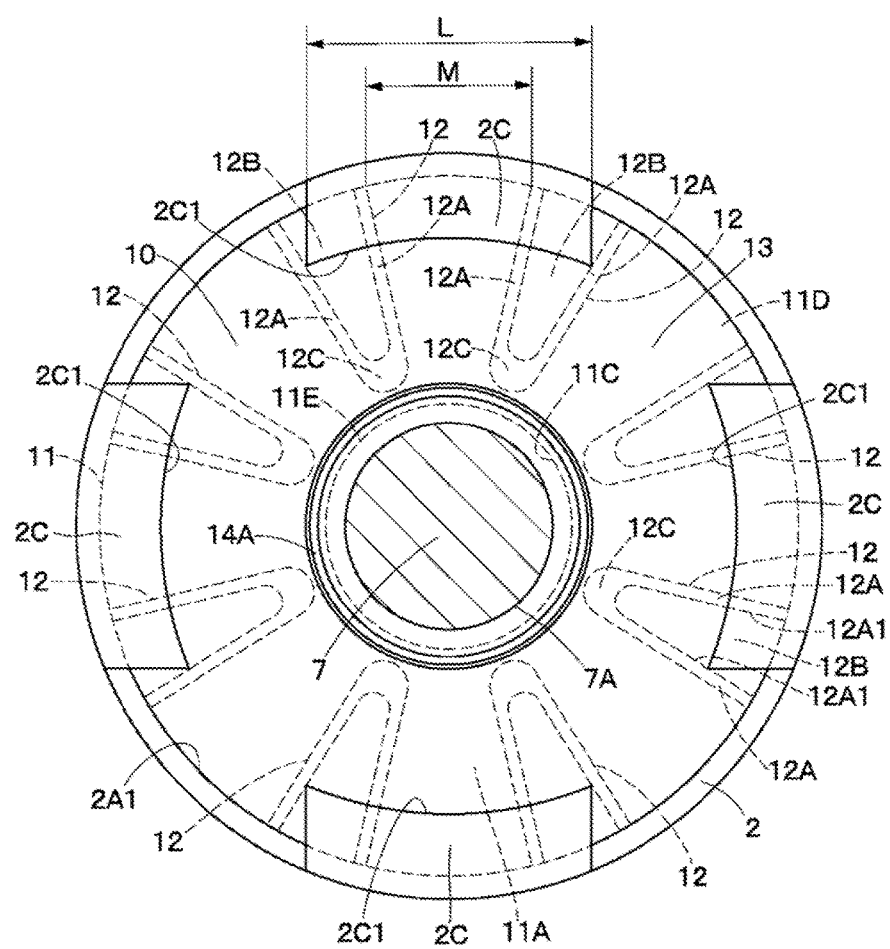
FIG. 3 is a sectional view of the hydraulic shock absorber in FIG. 1, as seen from the direction or arrow III-III.

As shown in FIGS. 2 and 3, the outer tube 2 has staked portions 2C provided at the one end 2A thereof by bending the distal end of the outer tube 2 radially inward. The staked portions 2C are provided at a plurality (e.g. four) of circumferentially spaced positions, for example. That is, the staked portions 2C are locally staked portions provided by staking the outer tube 2 locally at a plurality of positions spaced circumferentially of the outer tube 2. The staked portions 2C secure the below-described oil seal member 10 between themselves and the below-described rod guide 9.

To this case, each staked portion 2C is located on ribs 12 formed on a metal ring 11 of the below-described oil seal member 10. That is, as shown in FIG. 3, each staked portion 2C has a circumferential length dimension L set greater than a length dimension M between a pair of mutually adjacent ribs 12. Consequently, each staked portion 2C is provided to extend over two ribs 12 adjacent to each other. The ribs 12 extend closer to the inner diameter side 11E of the metal ring 11 than the distal ends 2C1 of the staked portions 2C. Thus, axial force applied to the staked portions 2C can be transmitted to the ribs 12 uniformly, and the oil seal member 10 can be secured stably.

The inner tube 4 as a cylinder is provided in the outer tube 2 in coaxial relation to the latter. The inner tube 4 has the below-described rod guide 9 fitted to the upper end thereof. The lower end of the inner tube 4 is fitted to the bottom cap 3 through a bottom valve 5 (described later).

Between the outer tube 2 and the inner tube 4 is formed an annular reservoir chamber A. The reservoir chamber A has a gas sealed therein, together with the above-described hydraulic oil. The gas may be air of atmospheric pressure or may also be a compressed gas, e.g. nitrogen gas. The gas in the reservoir chamber A is compressed when the below-described piston rod 7 contracts (compression stroke) to compensate for a volumetric change in the cylinder due to the entry of the piston rod 7 thereinto.

The bottom valve 5 is provided between the bottom cap 3 and the inner tube 4, being located at the lower end of the inner tube 4. The bottom valve 5 substantially comprises a stepped disk-shaped valve body 5A fitted and fixed between the lower end of the inner tube 4 and the upper surface of the bottom cap 3 and having annular valve seats formed on its obverse and reverse surfaces, respectively, oil passages 5B and 5C provided in the valve body 5A, a check valve 5D provided at the upper side of the valve body 5A, and a disk valve 5E provided at the lower side of the valve body 5A.

The bottom valve 5 operates as follows. When the piston rod 7 extends, together with the below-described piston 6, the disk valve 5E is closed, and the check valve 5D opens, thereby allowing the hydraulic oil in the reservoir chamber A to flow into a bottom-side oil chamber B (described later) through the oil passage 5B. On the other hand, when the piston rod 7 contracts, the check valve 5D is closed, and the disk valve 5E opens, thereby allowing the hydraulic oil in the bottom-side oil chamber B to flow into the reservoir chamber A. At this time, the disk valve 5E gives flow resistance to the hydraulic oil flowing through the oil passage 5C to generate damping force.

The piston 6 is slidably fitted in the inner tube 4. The piston 6 divides the interior of the inner tube 4 into two chambers, i.e. bottom-side oil chamber B, and rod-side oil chamber C. Further, the piston 6 is formed with oil passages 6A and 6B capable of providing communication between the bottom-side oil chamber B and the rod-side oil chamber C.

Further, a compression-side disk valve 6C is disposed at the upper end surface of the piston 6. The compression-side disk valve 6C gives resistance to the hydraulic oil flowing through the oil passage 6A to generate a predetermined damping force when the piston 6 is slidingly displaced downward in response to the contraction of the piston rod 7. At the lower end surface of the piston 6, on the other hand, an extension-side disk valve 6D is disposed which gives resistance to the hydraulic oil flowing through the oil passage 6B to generate a predetermined damping force when the piston 6 is slidingly displaced upward in response to the extension of the piston rod 7.

The piston rod 7 as a rod is connected at its lower end to the piston 6. That is, the lower end of the piston rod 7 is inserted into the inner tube 4 and fixed to the center position of the piston 6 with a nut 8 and so forth. On the other hand, the upper end of the piston rod 7 extendably and contractibly projects to the outside of the outer and inner tubes 2 and 4 through the rod guide 9 and so forth. Further, the outer peripheral surface 7A of the piston rod 7 is in air and fluid-tight sliding contact with a seal member 13 of the below-described oil seal member 10.

The rod guide 9 as an annular member is formed in a stepped circular cylindrical shape and fitted to the upper end of the outer tube 2 and also fitted to the inner tube 4, thereby being secured. Thus, the rod guide 9 positions an upper end portion of the inner tube 4 in coaxial relation to the outer tube 2 and guides at its inner peripheral side the piston rod 7 slidably in the axial direction. Further, the rod guide 9 constitutes a support structure that supports the below-described oil seal member 10 and the staked portions 2C of the outer tube 2 from the inner side (lower side) when the oil seal member 10 is secured (stakingly secured) by pressing the oil seal member 10 from the outer side (upper side) with the staked portions 2C of the outer tube 2.

The rod guide 9 is formed into a predetermined shape from a metal material, rigid resin material, or the like, for example. That is, the rod guide 9 is formed as a stepped circular cylinder from a large-diameter portion 9A located at the upper side and fitted to the inner peripheral side of the outer tube 2, and a small-diameter portion 9B located underneath the large-diameter portion 9A and fitted to the inner peripheral side of the inner tube 4. The small-diameter portion 9B has a guide portion 9C provided on the inner peripheral side thereof. The guide portion 9C guides the piston rod 7 slidably in the axial direction. The guide portion 9C is formed as a bearing made of a metallic cylinder having an inner peripheral surface coated with a fluorine-containing resin (tetrafluoroethylene), for example.

The upper side of the large-diameter portion 9A, which faces the below-described oil seal member 10 in the axial direction (vertical direction), forms a ring-shaped substantially flat top region 9D. The large-diameter portion 9A has a ring-shaped annular projection 9E formed at the outer peripheral side of the top region 9D, and further has a plurality of communication passages 9F (only one communication passage is shown in the figures) formed at the position of the annular projection 9E. The communication passages 9F axially extend through the large-diameter portion 9A.

Between the rod guide 9 and the oil seal member 10 is formed an oil-retaining chamber D. The oil-retaining chamber D is a space temporarily storing hydraulic oil or gas flowing out of the rod-side oil chamber C through a slight gap between the piston rod 7 and the rod guide 9. Hydraulic oil flowing out into the oil-retaining chamber D can be returned to the reservoir chamber A through the communication passages 9F in the rod guide 9.

The following is an explanation of the oil seal member 10 according to this embodiment.

The oil seal member 10 is located closer to the one end 2A (upper end) or the outer tube 2 than the rod guide 9 to close the one end 1A of the outer tube 2. The oil seal member 10 is formed in an annular shape and configured to seal the hydraulic oil from flowing out of the cylinder with a seal member 13 (described later) placed in sliding contact with the outer peripheral surface 7A of the piston rod 7. Further, the oil seal member 10 seals between itself and the piston rod 7 so that external dust, rainwater, and so forth cannot enter the cylinder. The oil seal member 10 is integrally formed from the metal ring 11 and the seal member 13.

Figure 4:
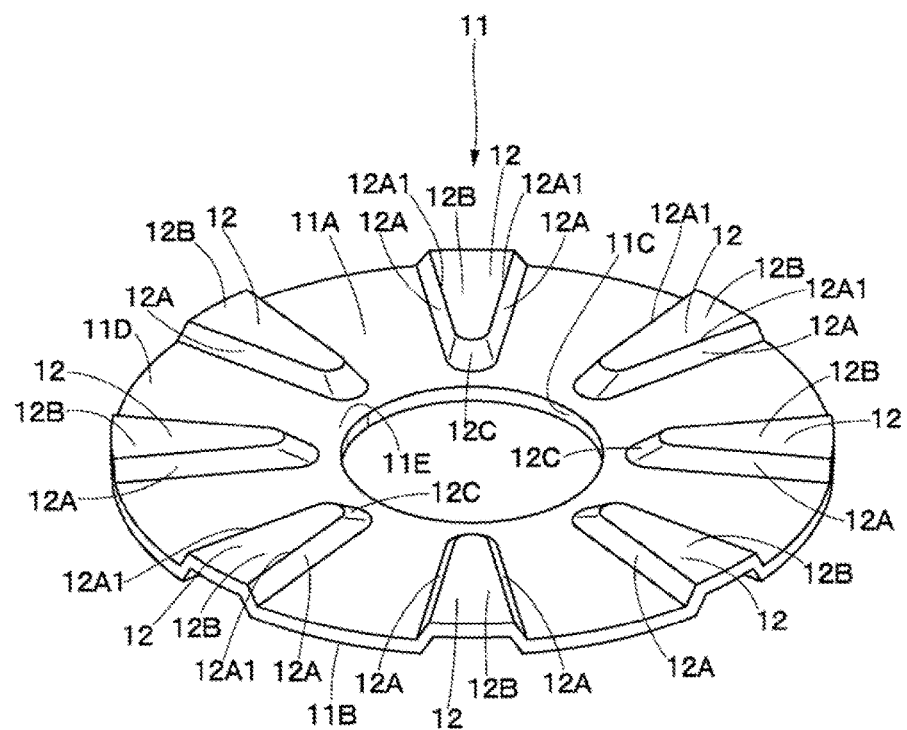
FIG. 4 is a perspective view showing a metal ring of an oil seal member as a single element.

The metal ring 11 is embedded so as to be surrounded by the constituent material of the below-described seal member 13, for example, by a molding method using a mold or the like to constitute a core metal of the oil seal member 10. That is, the metal ring 11 is coated externally with the resin constituting the seal member 13. As shown in FIG. 4, the metal ring 11 has a through-hole 11C extending through a central portion thereof from an upper surface 11A, as a planar portion, to a lower surface 11B. The through-hole 11C has the piston rod 7 inserted therethrough movably in the vertical direction with the seal member 13 interposed therebetween. Further, the metal ring 11 has a plurality (e.g. eight) of circumferentially spaced radial ribs 12 formed thereon such that the ribs 12 project upwardly from the upper surface 11A and extend radially.

The ribs 12 are formed by locally deforming the metal ring 11, for example, by press-working a stainless plate or the like. The ribs 12 are formed in a hill shape from the following portions: a multiplicity of rising portions 12A stood on the upper surface 11A over the entire circumference thereof substantially perpendicular to the upper surface 11A; joint portions 12B each joining together distal ends (upper ends) 12A1 of a pair of mutually adjacent rising portions 12A; and so forth.

As shown in FIGS. 3 and 4, each pair of mutually adjacent rising portions 12A extend to gradually come closer to each other from the outer diameter side 11D toward inner diameter side 11E of the metal ring 11. Each pair of mutually adjacent rising portions 12A are connected (joined) together by a connecting portion 12C at the inner diameter side 11E of the metal ring 11. That is, each pair of mutually adjacent rising portions 12A and the associated connecting portion 12C are formed in a substantially V or U-shape in plan view (as seen from the upper surface 11A side). Thus, each pair of mutually adjacent rising portions 12A extend from the outer diameter side 11D to inner diameter side 11E of the metal ring 11 and are connected together by a connecting portion 12C before reaching the through-hole 11C. Accordingly, the peripheral edge of the through-hole 11C in the metal ring 11, i.e. the inner diameter side 11E of the metal ring 11, forms a circumferentially annular flat surface.

Each joint portion 12B is located at the distal ends 12A1 of the associated rising portions 12A and forms a substantially triangular or trapezoidal flat surface in plan view. Accordingly, the ribs 12 are tapered from the outer diameter side 11D toward inner diameter side 11E of the metal ring 11 and radially extend at a position one level higher than the upper surface 11A of the metal ring 11. Thus, the metal ring 11 can be improved in yield strength to axial force applied thereto.

As shown in FIG. 3, the ribs 12 are formed to extend closer to the inner diameter side 11E of the metal ring 11 than the distal ends 2C1 of the staked portions 2C. In addition, the length dimension M between each pair of mutually adjacent ribs 12 is set shorter than the circumferential length dimension L of each staked portion 2C. More preferably, the length dimension between the joint portions 12B of each pair of mutually adjacent ribs 12 is set shorter than the circumferential length dimension L of each staked portion 2C. With this structure, the staked portions 2C can be disposed on the ribs 12. As a result, axial force applied to the staked portions 2C can be transmitted to the ribs 12 uniformly, and the oil seal member 10 can be secured stably.

In addition, the rising portions 12A are formed by being bent as nearly at right angles (perpendicular) to the upper surface 11A as possible. In this case, the angle of the rising portions 12A to the upper surface 11A is preferably from not less than 60° to not more than 90°, more preferably, from not less than 80° to not more than 90°. With this structure, axial force acting on the joint portions 12B of the ribs 12 can be effectively transmitted to the upper surface 11A through the rising portions 12A, and it is therefore possible to increase the mechanical strength of the metal ring 11.

The seal member 13 is provided in such a manner as to cover the metal ring 11. The seal member 13 is formed into a stepped cylindrical shape from a synthetic resin mater lot (elastic material), for example, nitrile rubber or the like. The seal member 13 slidingly contacts the outer peripheral side of the piston rod 7 to seal between the metal ring 11 and the piston rod 7. As shown in FIG. 2, the seal member 13 has an upper lip portion 13A provided on the inner diameter side thereof at an upper position projecting axially outward from the metal ring 11. The seal member 13 further has two vertically spaced lower lip portions 13B and 13C provided on the inner diameter side thereof at a lower position projecting axially inward from the metal ring 11.

Further, the seal member 13 has an upper annular plate portion 13D and lower annular plate portion 13E integrally formed therewith so that the upper and lower annular plate portions 13D and 13E face each other. The upper annular plate portion 13D extends from the proximal end of the upper lip portion 13A toward the outer diameter side along the upper surface 11A of the metal ring 11. The lower annular plate portion 13E extends from the mutual proximal end of the lower lip portions 13B and 13C toward the cuter diameter side along the lower surface 11B of the metal ring 11. Between the annular plate portions 13D and 13E is a mounting groove 13F. In the mounting groove 13F, the metal ring 11 is fixed by using a method such as welding, bonding, or the like. Here, the lower annular plate portion 13E of the seal member 13 extends to the outer diameter side 11D of the metal ring 11 and has a check valve element 13G integrally formed therewith at a halfway position in the radial direction of the lower annular plate portion 13E. Further, the lower annular plate portion 13E has a seal ring 13H integrally formed with the outermost diameter portion thereof.

The check valve element 13G is disposed between the oil-retaining chamber D and the reservoir chamber A, and the distal end of the check valve element 13G abuts on the top region 9D of the rod guide 9 with an interference. The check valve element 13G allows the hydraulic oil in the oil-retaining chamber D to flow into the reservoir chamber A through the communication passages 9F in the rod guide 9 but prevents the flow in the opposite direction. That is, the check valve element 13G prevents the gas and hydraulic oil in the reservoir chamber A from flowing toward the oil-retaining chamber D. In addition, the seal ring 13H prevents the gas and hydraulic oil in the reservoir chamber A from leaking to the outside through between the outer tube 2 and the metal ring 11.

The seal member 13 has the upper lip portion 13A brought into sliding contact with the outer peripheral side of the piston rod 7 with an interference by a ring-shaped retaining spring 14A, and further has the lower lip portions 13B and 13C brought into sliding contact with the outer peripheral side of the piston rod 7 with an interference by a retaining spring 14B, thereby fluid-tightly sealing between the seal member 13 and the piston rod 7.

The following is an explanation of one example of a procedure for securing the oil seal member 10 to the upper end of the outer tube 2 of the hydraulic shock absorber 1 according to this embodiment having the above-described structure.

First, the piston rod 7 is inserted through the guide portion 9C of the rod guide 9, and while doing so, the large-diameter portion 9A is press-fitted into the outer tube 2, and the small-diameter portion 9B is press-fitted into the inner tube 4. Subsequently, the piston rod 7 is inserted through the seal member 13 in a state where the upper lip portion 13A and lower lip portions 13B and 13C of the seal member 13 of the oil seal member 10 are abutted against the outer peripheral surface 7A of the piston rod 7.

Next, the lower annular plate portion 13E of the seal member 13 is abutted (placed) on the annular projection 9E of the rod guide 9. In this case, the distal end of the check valve element 13G abuts on the top region 9D of the rod guide 9 with an interference. Consequently, the oil-retaining chamber D is formed between the rod guide 9 and the oil seal member 10.

Next, the distal end (staked portions 2C) of the outer tube 1 is bent radially inward while the oil seal member 10 is being pressed (pressurized) from above with a pressing tool (not shown) in order to leave a residual axial force in the outer and inner tubes 2 and 4. Consequently, the oil seal member 10 is stakingly secured by the staked portions 2C between the same and the rod guide 9.

Incidentally, the conventional technique has the problem that if pressing force applied to the oil seal member is large, the metal ring of the oil seal member may be elastically deformed, so that it may be impossible to stably close the upper end of the hydraulic shock absorber. Under these circumstances, it is conceivable to increase the mechanical strength of the metal ring by increasing the plate thickness of the metal ring or stacking a plurality of metal rings. However, this approach causes an increase in weight of the oil seal member, resulting in an increase in weight of the hydraulic shock absorber unfavorably.

In view of the above, in this embodiment, the metal ring 11 of the oil seal member 10 is formed with a plurality of radially extending ribs 12. Specifically, the metal ring 11 has a plurality (e.g. eight) of circumferentially spaced radial ribs 12 formed thereon such that the ribs 12 project upwardly from the upper surface 11A and extend radially. Further, the ribs 12 are formed to extend closer, to the inner diameter side 11E of the metal ring 11 than the distal ends 2C1 of the staked portions 2C. With this structure, pressing force applied to the oil seal member 10 acts on the joint portions 12B of the ribs 12 through the upper annular plate portion 13D of the seal member 13. Accordingly, even if the pressing force applied to the oil seal member 10 is large, elastic deformation (flexure) of the metal ring 11 can be suppressed by the ribs 12.

In addition, as shown in FIG. 3, the length dimension M between each pair of mutually adjacent ribs 12 is set shorter than the circumferential length dimension L of each staked portion 2C. With this structure, the staked portions 2C can be disposed on the ribs 12. As a result, axial force applied to the staked portions 2C can be transmitted to the ribs 12 uniformly, and the oil seal member 10 can be secured stably.

In addition, the rising portions 12A of the ribs 12 are formed by being bent as nearly at right angles (perpendicular) to the upper surface 11A as possible. With this structure, axial force acting on the joint portions 12B of the ribs 12 can be effectively transmitted to the upper surface 11A of the metal ring 11 through the rising portions 12A, and it is therefore possible to increase the mechanical strength of the metal ring 11.

Thus, according to this embodiment, the metal ring 11 constituting the oil seal member 10 of the hydraulic shock absorber 1 has a plurality of radially extending ribs 12 provided by locally deforming the metal ring 11. Consequently, it is possible to compatibly achieve an increase in mechanical strength and a reduction in weight of the metal ring 11 and hence possible to reduce the weight of the hydraulic shock absorber 1.

Figure 5:
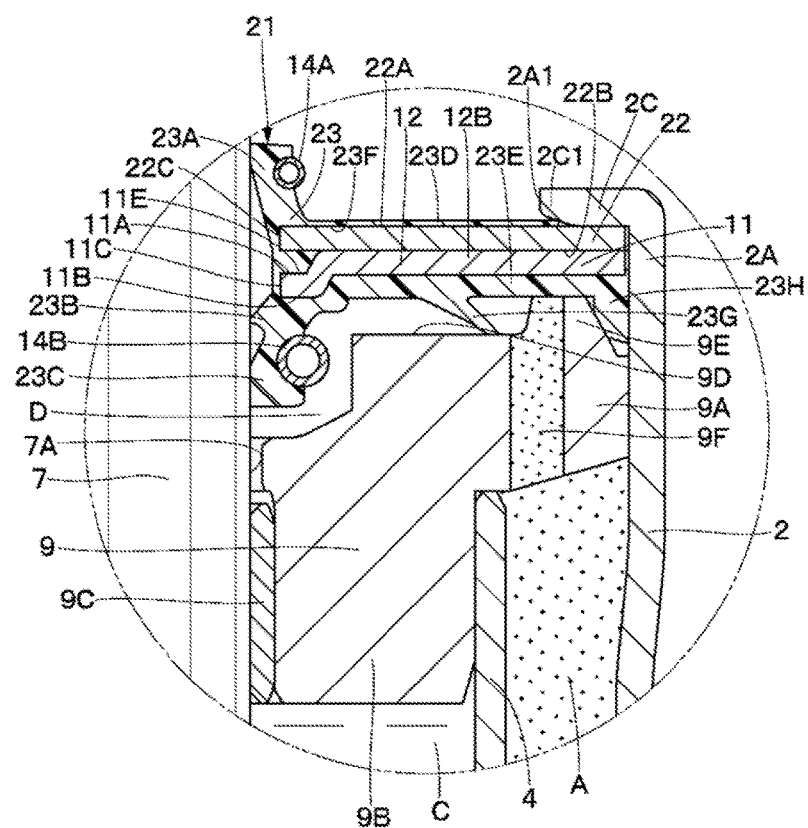
FIG. 5 is a vertical sectional view of a hydraulic shock absorber according to a second embodiment of the present invention as seen from a position similar to that of FIG. 2.

Next, FIG. 5 shows a second embodiment of the present invention. The feature of the second embodiment resides in that the metal ring 11 is provided with an annular plate 22 for reinforcement. It should be noted that, in the second embodiment, the same constituent elements as those of the foregoing first embodiment are denoted by the same reference numerals as those used in the first embodiment, and a description thereof is omitted.

An oil seal member 21 is located closer to the one end 2A of the outer tube 2 than the rod guide 9 to close the one end 2A of the outer tube 2. The oil seal member 21 is integrally formed from the metal ring 11, an annular plate 22, and a seal member 23.

The annular plate 22 as a first annular plate is provided closer to the staked portions 2C than the metal ring 11. The annular plate 22 is a plate material for reinforcement that suppresses deformation of the metal ring 11 caused by axial force acting on the metal ring 11. The annular plate 22 is formed of an annular metal plate, for example, and has an upper surface 22A and a lower surface 22B, which are uniform flat surfaces, respectively. Further, the annular plate 22 has a through-hole 22C extending therethrough from the upper surface 22A to the lower surface 22B in coaxial relation to the through-hole 11C in the metal ring 11. The through-hole 22C has the piston rod 7 inserted therethrough movably in the vertical direction with the seal member 23 interposed therebetween. It should be noted that the bore diameter of the through-hole 22C may be the same as or different from that of the through-hole 11C in the metal ring 11.

Further, the annular plate 23 is fitted, together with the metal ring 11, in a mounting groove 23F of the seal member 23 and bonded in this state with the lower surface 22B abutted on the joint portions 12B of the ribs 12, which are formed on the metal ring 11. It should be noted that the area between the lower surface 22B of the annular plate 22 and the upper surface 11A of the metal ring 11 is filled with the below-described seal member 23. That is, the oil seal member 21 has the metal ring 11 and the annular plate 22 integrally formed with the seal member 23. Accordingly, the metal ring 11 and the annular plate 22 are externally coated with the resin constituting the seal member 23 in the state of being superimposed on one another.

The seal member 23 is provided to cover the metal ring 11 and the annular plate 22. The seal member 23 is formed using a synthetic resin material substantially in the same way as the seal member 13 in the above-described first embodiment. The seal member 23 comprises an upper lip portion 23A, lower lip portions 23B and 23C, an upper annular plate portion 23D, a lower annular plate portion 23E, a mounting groove 23F, a check valve element 23G, a seal ring 23H, and so forth.

According to the second embodiment structured as stated above, the mechanical strength can be further increased by the two members, i.e. the metal ring 11, and the annular plate 22. In this case, the metal ring 11 is formed with the ribs 12.

Therefore, the annular plate 22 can be reduced in plate thickness as compared to a structure in which an annular plate for reinforcement is superimposed on a metal ring having no rib, for example. Consequently, it is possible to compatibly achieve an increase in mechanical strength and a reduction in weight and hence possible to reduce the weight of the hydraulic shock absorber 1.

Figure 6:
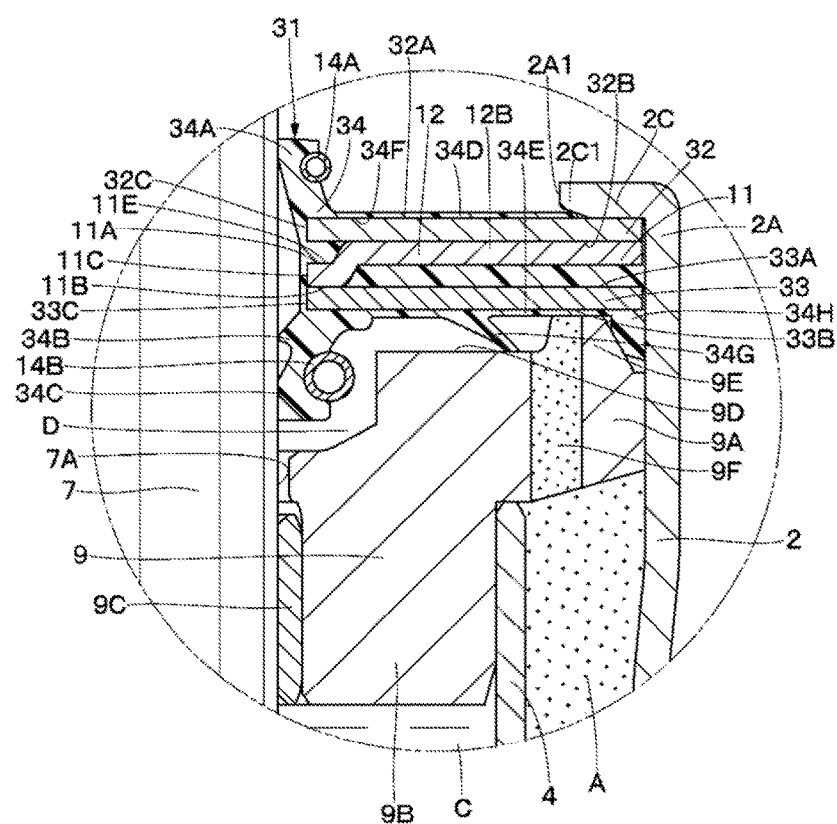
FIG. 6 is a vertical sectional view or a hydraulic shock absorber according to a third embodiment of the present invention as seen from a position similar to that of FIG. 2.

Next, FIG. 6 shows a third embodiment of the present invention. The feature of the third embodiment resides in that the metal ring 11 is provided with a first annular plate 32 and second annular plate 33 for reinforcement. It should be noted that, in the third embodiment, the same constituent elements as those of the foregoing first embodiment are denoted by the same reference numerals as those used in the first embodiment, and a description thereof is omitted.

An oil seal member 31 is located closer to the one end 2A of the outer tube 2 than the rod guide 9 to close the one end 2A or the outer tube 2. The oil seal member 31 is integrally formed from the metal ring 11, a first annular plate 32, a second annular plate 33, and a seal member 34.

The first annular plate 32 is provided closer to the staked portions 2C than the metal ring 11. The first annular plate 32 has a structure similar to that of the above-described annular plate 22, and comprises an upper surface 32A, a lower surface 32B, and a through-hole 32. The through-hole 32C has the piston rod 7 inserted therethrough movably in the vertical direction with the seal member 34 interposed therebetween. The first annular plate 32 abuts on the joint portions 12B of the ribs 12, which are formed on the metal ring 11. It should be noted that the area between the lower surface 32B of the first annular plate 32 and the upper surface 11A of the metal ring 11 is filled with the below-described seal member 34.

The second annular plate 33 is provided closer to the rod guide 9 than the metal ring 11. The second annular plate 33 has a structure similar to that of the first annular plate 32, and comprises an upper surface 33A, a lower surface 33B, and a through-hole 33C. The through-hole 33C has the piston rod 7 inserted therethrough movably in the vertical direction with the seal member 34 interposed therebetween.

It should be noted that the plate thickness of the second annular plate 33 may be the same as or different from that of the first annular plate 32. The bore diameter of the through-hole 33C may be the same as or different from that of the through-hole 11C in the metal ring 11 or that of the through-hole 32C in the first annular plate 32. The second annular plate 33 abuts at its upper surface 33A against the lower surface 11B of the metal ring 11. It should be noted that the area between the upper surface 33A of the second annular plate 33 and the ribs 12 is filled with the below-described seal member 34.

The metal ring 11 and the first and second annular plates 32 and 33 are fitted in a mounting groove 34F of the seal member 34 and bonded in this state. That is, the oil seal member 31 has the metal ring 11 and the first and second annular plates 32 and 33 integrally formed with the seal member 34. Accordingly, the metal ring 11 and the first and second annular plates 32 and 33 are externally coated with the resin constituting the seal member 34 in the state of being superimposed on one another.

According to the third embodiment structured as stated above, the mechanical strength can be increased even further by the three members, i.e. the metal ring 11, the first annular plate 32, and the second annular plate 33. In this case, the metal ring 11 is formed with the ribs 12. Therefore, the first annular plate 32 and the second annular plate 33 can be reduced in plate thickness as compared to a structure in which first and second annular plates for reinforcement are superimposed on a metal ring having no rib, for example. Consequently, it is possible to compatibly achieve an increase in mechanical strength and a reduction in weight and hence possible to reduce the weight of the hydraulic shock absorber 1.

Figure 7:
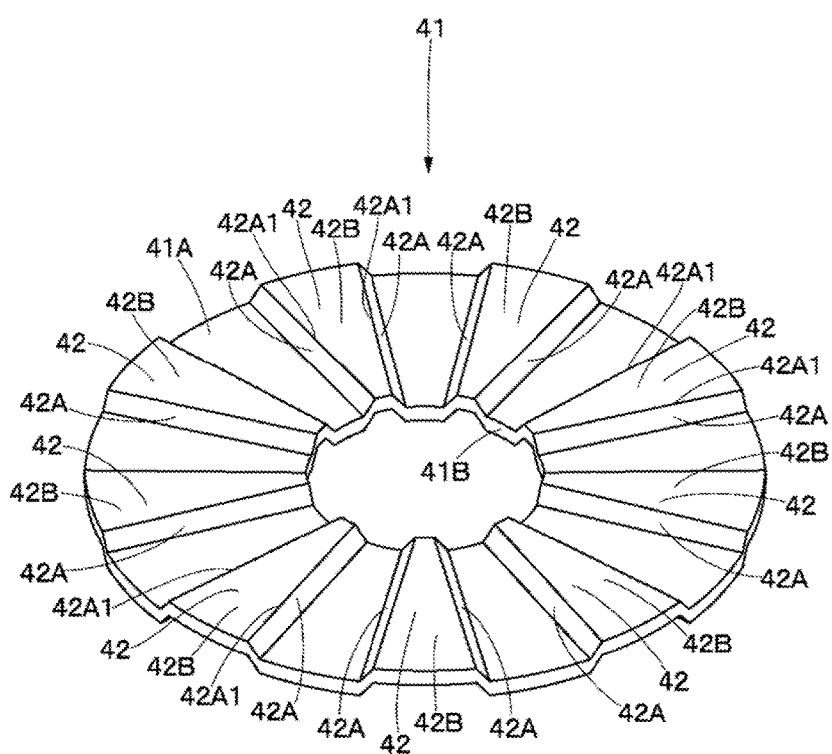
FIG. 7 is a perspective view of a metal ring according to a first modification of the present invention as seen from a position similar to that of FIG. 4.

It should be noted that, in the foregoing first embodiment, the present invention has been explained taking as an example a case where each pair of mutually adjacent rising portions 12A of the ribs 12 formed on the metal ring 11 are connected together by a connecting portion 12C at the inner diameter side 11E of the metal ring 11. However, the present invention is not limited thereto. For example, as in a first modification shown in FIG. 7, a metal ring 41 may be alternately recessed and raised in the circumferential direction. That is, ribs 42 formed on the metal ring 41 may each comprise rising portions 42A extending from the outer diameter side 41A to through-hole 41B of the metal ring 41, and a joint portion 42B joining together the distal ends 42A1 of the rising portions 42A. This applies similarly to the second and third embodiments.

Figure 8:
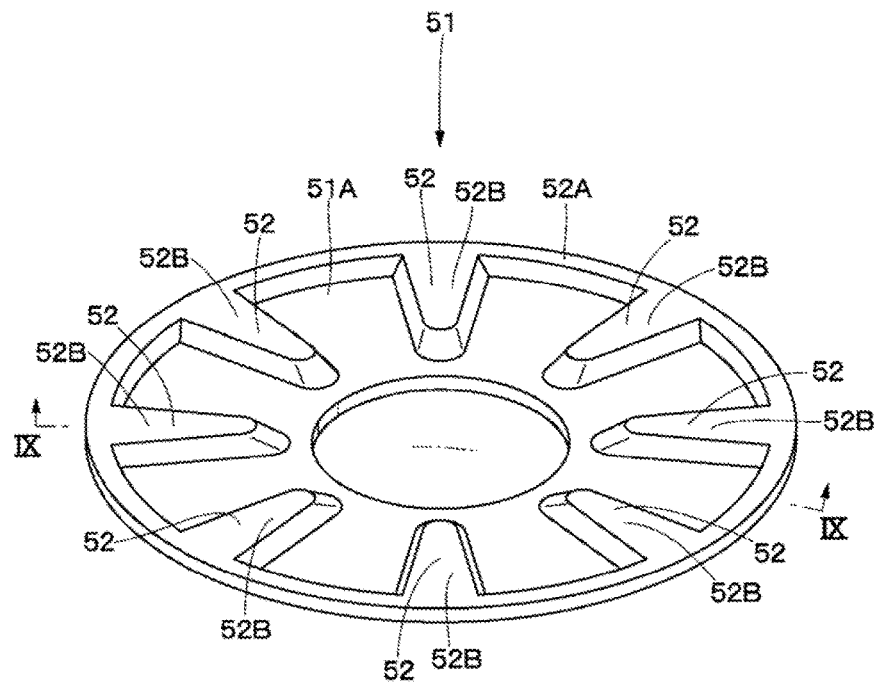
FIG. 8 is a perspective view of a metal ring according to a second modification of the present invention as seen from a position similar to that of FIG. 4.
Figure 9:
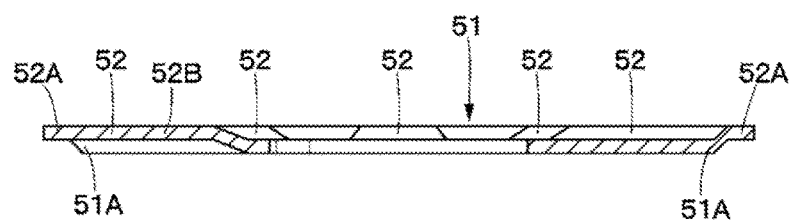
FIG. 9 is a sectional view of the metal ring in FIG. 8, as seen from the direction of arrow IX-IX.

Further, as in a second modification shown in FIGS. 8 and 9, for example, ribs 52 formed on a metal ring 51 may be circumferentially joined together at the outer diameter side 51A of the metal ring 51 to provide a staking abutment portion 52A. That is, a staking abutment portion 52A to be abutted with the staked portions 2C may be formed on the outer diameter side 51A of the metal ring 51, being joined to the ribs 52. Thus, axial force applied to the staked portions 2C can be borne by the staking abutment portion 52A and the joint portions 52B over a wide range. Therefore, the oil seal member can be secured even more stably. This applies similarly to the second and third embodiments and the first modification.

Further, in the foregoing first embodiment, the present invention has been explained taking as an example a case where the staked portions 2C are locally staked portions provided at four positions mutually spaced circumferentially of the outer tube 2. However, the present invention is nor limited thereto. For example, locally staked portions may be provided at two or three positions or five or more positions. Alternatively, the entire circumference of the outer tube 2 may be staked to provide an all-around staked portion. This applies similarly to the second and third embodiments.

Further, in the foregoing first embodiment, the present inverse ion has been explained taking as an example a case where the metal ring 11 is provided with eight circumferentially spaced ribs 12. However, the present invention is not limited thereto. For example, the metal ring may be provided with three to seven ribs or nine or more ribs. This applies similarly to the second and third embodiments and the first and second modifications.

Further, in the foregoing first embodiment, the present invention has been explained taking as an example a case where each staked portion 2C is provided to extend over between a pair of mutually adjacent ribs 12. However, the present invention is not limited thereto. For example, each staked portion may be provided on one rib or may be provided to extend over three or more ribs. This applies similarly to the second and third embodiments and the first and second modifications.

Further, in the foregoing first embodiment, the present invention has been explained taking as an example the hydraulic shock absorber 1, in which the piston rod 7 projects from the one end 2A of the outer tube 2, and in which the other end 2B of the outer tube 2 is closed with the bottom cap 3. However, the present invention is not limited thereto. For example, the present invention is also applicable to a double-rod type hydraulic shock absorber in which a piston rod projects from opposite ends of an outer tube, i.e. one end and the other end thereof, and in which the oil seal member 21 is provided at each of the two ends of the outer tube. This applies similarly to the second and third embodiments and the first and second modifications.

Further, in the foregoing first embodiment, the present invention has been explained taking as an example a case where the oil seal member 21 having the metal ring 14 provided in the dual-tube hydraulic shock absorber 1 having the outer and inner tubes 2 and 4 as a cylinder. However, the present invention is not limited thereto. For example, the oil seal member 21 having the metal ring 14 may be applied to a mono-tube hydraulic shock absorber. This applies similarly to the second and third embodiments and the first and second modifications.

Further, in the foregoing third embodiment, the present invention has been explained taking as an example a case where the first annular plate 32 is provided at the upper side of the metal ring 11, and the second annular plate 33 is provided at the lower side of the metal ring 11. However, the present invention is not limited thereto. For example, the structure may be such that the first annular plate 32 is not provided, and the second annular plate 33 is provided only at the lower side of the metal ring 11.

Further, in the foregoing embodiments, the present invention has been explained taking as an example the hydraulic shock absorber 1 attached to each wheel of a four-wheeled automobile. However, the present invention is not limited thereto. For example, the present invention may also be applied to a hydraulic shock absorber used in a two-wheeled vehicle. It is also possible to apply the present invention to hydraulic shock absorbers used in various machines, architectural structures, etc. in addition to vehicles, and also to cylinder apparatus driven in response to supply and discharge of pressure oil.

The following is a description of inventions included in the foregoing embodiments. According to the present indention, the ribs are formed to extend closer to the inner diameter side than the distal ends of the staked portions. Thus, axial force applied to the oil seal member can be borne by the ribs. Accordingly, deformation of the metal ring can be suppressed even if pressing force applied to the oil seal member is large. In addition, because the staked portions can be provided over a wide range over the ribs, axial force applied to the staked portions can be transmitted to the ribs.

In addition, the oil seal member has the metal ring and both or either of a first annular plate provided closer to the staked portions than the metal ring and a second annular plate provided closer to the annular member than the metal ring, and the metal ring and both or either of the first annular plate and the second annular plate are integrally formed with the seal member. With this structure, deformation of the metal ring can be suppressed.

The staked portions are locally staked portions provided by staking the outer tube locally at a plurality of circumferentially spaced positions. The staked portions each have a circumferential length dimension. A length dimension between a pair of mutually adjacent ribs is narrower than the circumferential length dimension of each of the staked portions. With this structure, each staked portion can be provided to extend over a pair of mutually adjacent ribs. Consequently, axial force applied to the staled portions can be transmitted to the ribs uniformly, and the oil seal member can be secured stably.

The ribs are formed in a hill shape from a multiplicity of rising portions stood on a planar portion of the metal ring over the entire circumference thereof substantially perpendicular to the planar portion, and joint portions each joining together the distal ends of a pair of mutually adjacent rising portions. With this structure, axial force acting on the joint portions of the ribs can be effectively transmitted to the upper surface of the metal ring through the rising portions, and it is therefore possible to increase the mechanical strength of the metal ring.

In addition, a staking abutment portion to be abutted with the staked portions is formed on the outer diameter side of the metal ring, being joined to the ribs. With this structure, axial force applied to the staked portions can be borne by the staking abutment portion and the joint portions over a wide range. Therefore, the oil seal member can be secured even more stably.

Although only some exemplary embodiments of this invention have been described above, those skilled in the art will readily appreciate that various changes or improvements can be made to the exemplary embodiments without materially departing from the novel teaching and advantages of this invention. Accordingly, all such modifications are intended to be included within the scope of this invention. The foregoing embodiments may be combined at will.

The present application claims priority to Japanese Patent Application No. 2014-262421 filed on Dec. 25, 2014. The entire disclosure of Japanese Patent Application No. 2014-262421 filed on Dec. 25, 2014 including specification, claims, drawings and summary is incorporated herein by reference in its entirety.

REFERENCE SIGNS LIST

1: hydraulic shock absorber (cylinder apparatus);
2: outer tube (cylinder);
2A: one end;
2A1: opening;
2B: the other end;
22: staked portion;
2C1: distal end;
4: inner tube (cylinder);
7: piston rod;
9: rod guide (annular member);
10, 21, 31: oil seal member;
11, 41, 51: metal ring;
11A: upper surface (planar portion);
12, 42, 52: rib;
12A, 42A: rising portion;
12A1, 42A1: distal end;
12B, 42B, 52B: joint portion;
13, 23, 34: seal member;
22: annular plate (first annular plate);
32: first annular plate;
33: second annular plate.

The invention claimed is:
1. A cylinder apparatus comprising:
a cylinder having au opening at one end thereof and having a hydraulic fluid sealed therein;
a rod that projects from at least the one end of the cylinder;
an annular member provided at the one end of the cylinder;
an annular oil seal member provided at a position closer to the one end of the cylinder than the annular member so as to face the annular member; and a staked portion provided at the one end of the cylinder to secure the oil seal member between the staked portion and the annular member in an axial direction of the cylinder, the oil seal member including a metal ring and a seal member that surrounds the metal ring;

the metal ring having a plurality of radially extending ribs provided by locally deforming the metal ring, the ribs being formed so to extend closer to an inner diameter side than a distal end of the staked portion, and the ribs being formed so as to extend to the inner diameter side from a position where the oil seal member is secured in the axial direction by the staked portion.

2. The cylinder apparatus of claim 1, wherein the oil seal member includes the metal ring and a first annular plate provided closer to the staked portion than the metal ring and/or a second annular plate provided closer to the annular member than the metal ring, the metal ring and at least one of the first annular plate and the second annular plate being integrally formed with the seal member.

3. The cylinder apparatus of claim 1, wherein the staked portion comprises locally staked portions provided by staking the cylinder locally at a plurality of circumferentially spaced positions, the staked portions each having a circumferential length dimension, a length dimension between a pair of mutually adjacent ones of the ribs is narrower than the circumferential length dimension of each of the staked portions.

4. The cylinder apparatus of claim 1, wherein the ribs are formed in a hill shape from a multiplicity of rising portions that are stood on a planar portion of the metal ring over an entire circumference thereof to be substantially perpendicular to the planar portion, and joint portions each joining together distal ends of a pair of mutually adjacent ones of the rising portions.

5. The cylinder apparatus of claim 1, further comprising:
a staking abutment portion to be abutted with the staked portion, the staking abutment portion being formed on an outer diameter side of the metal ring, and being joined to the ribs.

* * * * *